Jan. 4, 1944.  R. P. HANNA ET AL  2,338,510
TROLLEY CONDUCTOR DEVICE
Filed May 24, 1941   3 Sheets-Sheet 2
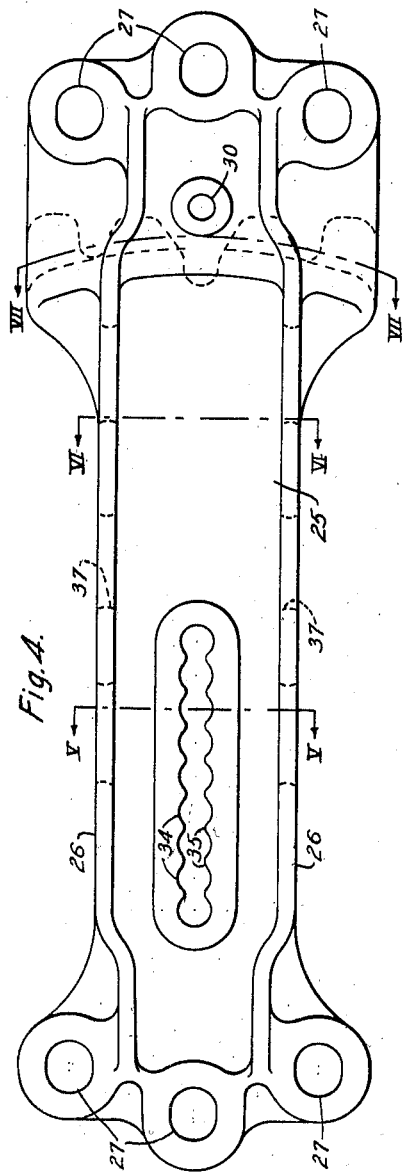
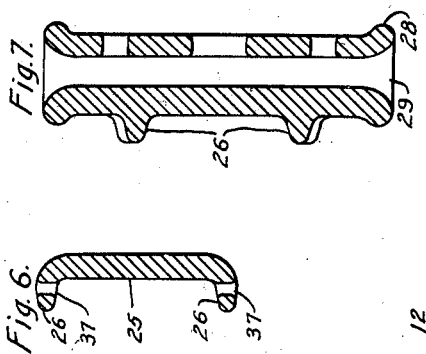
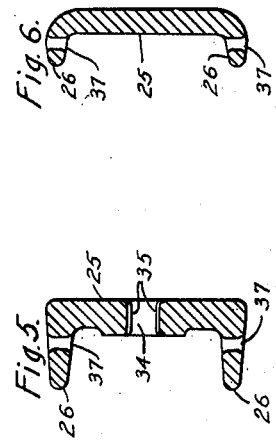
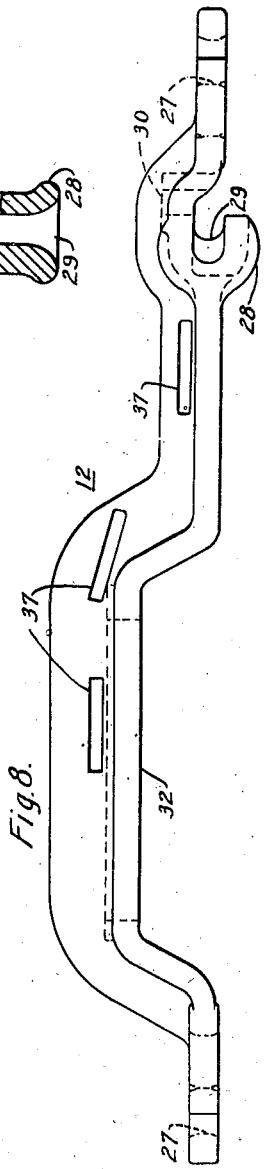
WITNESSES:
INVENTORS
Angus G. Scott and
Raymond P. Hanna.
BY
ATTORNEY Jan. 4, 1944.  R. P. HANNA ET AL  2,338,510
TROLLEY CONDUCTOR DEVICE
Filed May 24, 1941  3 Sheets-Sheet 3
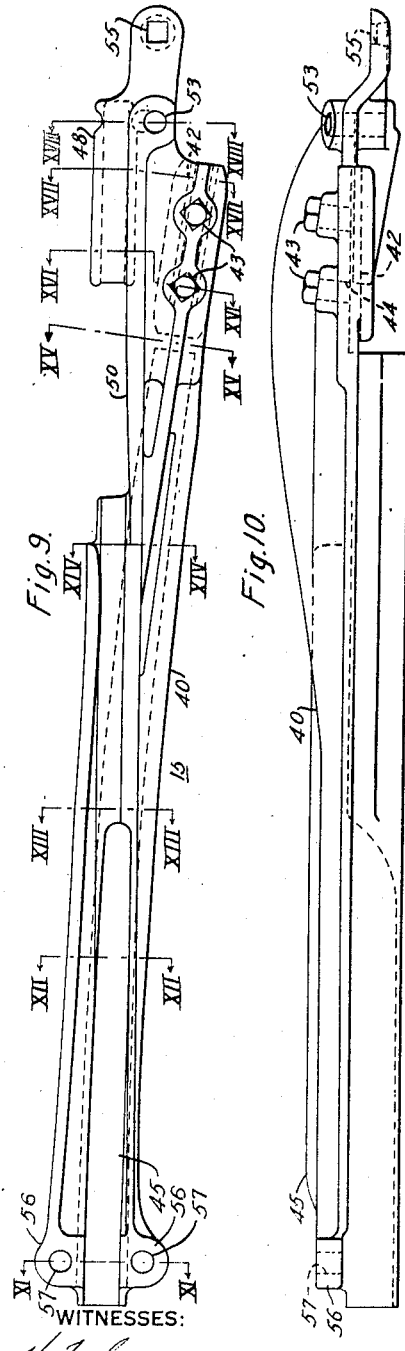
INVENTORS
Angus G. Scott and
Raymond P. Hanna.
BY Crawford
ATTORNEY Patented Jan. 4, 1944

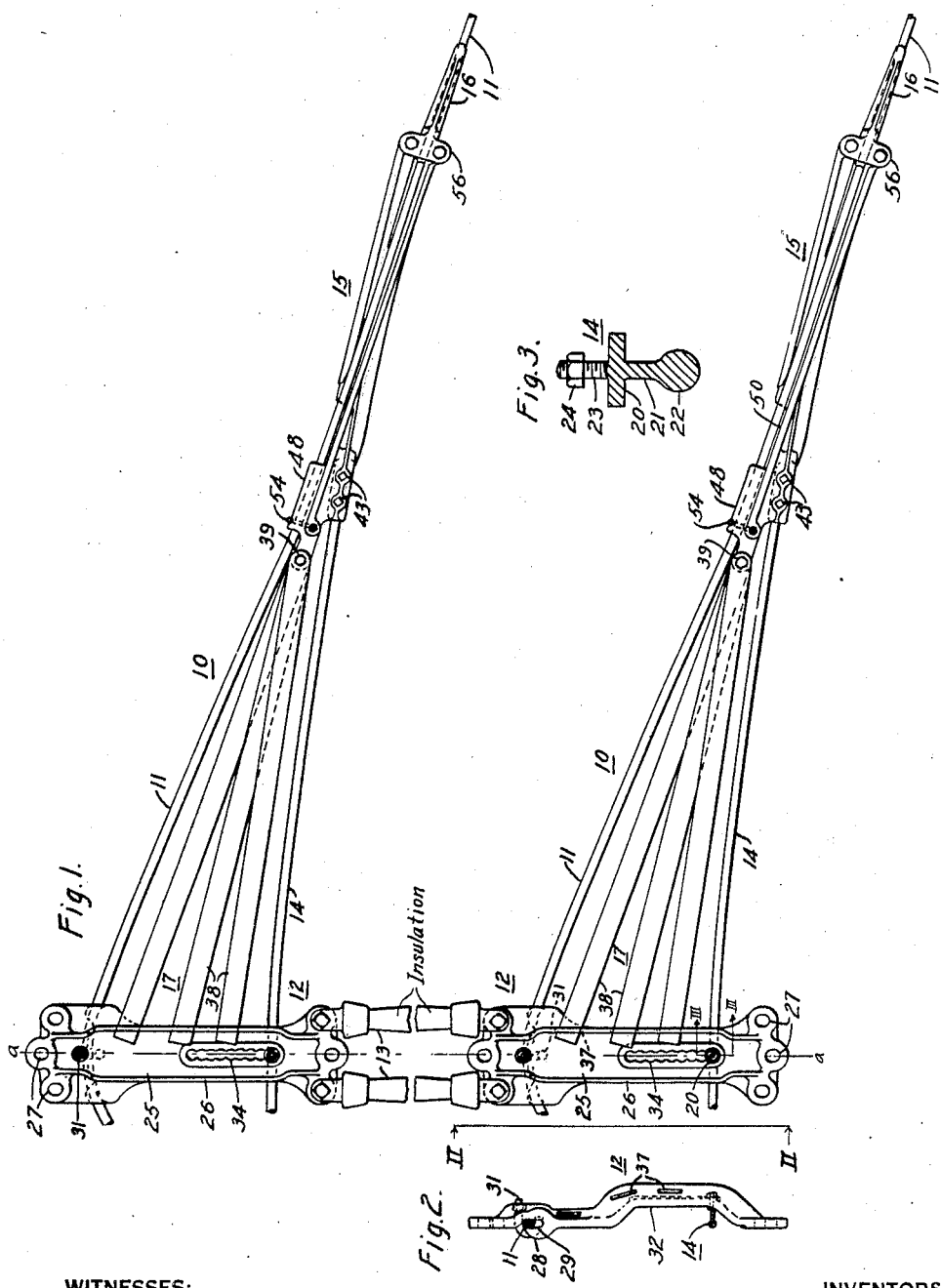

2,338,510

UNITED STATES PATENT OFFICE 2,338,510

TROLLEY CONDUCTOR DEVICE

Raymond P. Hanna, Pittsburgh, and Angus G. Scott, Mount Lebanon, Pa., assignors to Westinghouse Electric & Manufacturing Company, East Pittsburgh, Pa., a corporation of Pennsylvania Application May 24, 1941, Serial No. 394,986

13 Claims. (Cl. 191—33)

Our invention relates, generally, to trolley conductor devices, and it has reference, in particular, to rigid curved segments for use with trolley conductors in trolley conductor systems.

Generally stated, it is an object of our invention to produce a light and durable rigid curved segment for use with trolley conductors, which shall be simple and inexpensive to manufacture, and which may be readily installed and adjusted to the desired curvature.

More specifically, it is an object of our invention to provide for so connecting a laterally flexible curved runner or body member to a trolley conductor that the portion of the trolley conductor between the ends of the runner member may be pulled off laterally in substantially the normal horizontal plane of the conductor without appreciably stressing or distorting the runner member.

Another object of our invention is to provide end members for so connecting the laterally flexible runner or body member of a curved segment to a trolley conductor that the trolley conductor may be diverted from the path of a current collector and depressed into the normal plane of the conductor in spaced relation to the runner member by the end members.

A further object of our invention is to utilize rigid end members for connecting a trolley conductor to a relatively light flexible curved runner or body member so as to enable the trolley conductor to be pulled off tangentially to the runner member in substantially the normal plane of the conductor to prevent setting up vertical bending moments in the runner member or body member which tend to twist or distort said member.

Yet another object of our invention is to provide for adjustably connecting a laterally flexible curved runner member to a pull-off member in different positions so as to vary the curvature of the runner member.

Still another object of our invention is to provide an adjustable guard for covering a fan-shaped opening between a trolley conductor and a portion of a trolley device to prevent a dewired current collector from becoming wedged therein.

Other objects will in part be obvious, and will in part be explained hereinafter.

In accordance with our invention, the ends of a laterally flexible curved runner or body member may be attached to a trolley conductor to provide a smooth curve therein by means of substantially rigid end members having runner portions on the lower side, and which provide for raising the conductor above its normal horizontal plane, diverting it to one side of the runner portion so as to be clear of a passing current collector and then depressing it into the normal plane in laterally spaced relation to the runner portion. The portion of the conductor between the end members may then be pulled-off laterally and secured to a suitable pull-off member in the normal plane of the conductor. The bending moments normally introduced by diverting the conductor from its normal plane are limited to the rigid end members so that the curved runner or body member is substantially free from bending stresses which might otherwise be produced therein by the conductor as does not, therefore, tend to twist or otherwise become distorted. The curvature of the laterally flexible runner or body member may be readily adjusted by utilizing a plurality of longitudinally spaced openings in the pull-off member wherein a bolt secured to an intermediate portion of the runner or body member may be detachably positioned in any one of a number of different positions. A suitable guard for preventing a dewired current collector from becoming wedged in the openings between the runner member and the conductor may be provided by detachably connecting a plurality of metal strips to the pull-off member in spaced relation and connecting the other ends thereof to the end member.

For a more complete understanding of the nature and scope of our invention, reference may be had to the following detailed description which is to be taken in connection with the accompanying drawings, in which Figure 1 is a partial plan view of a curved construction embodying the principal features of the invention;

Fig. 2 is a view taken along the line II—II of Fig. 1;

Fig. 3 is an enlarged sectional view of the runner member taken along the line III—III of Fig. 1;

Fig. 4 is an enlarged plan view of the pull-off member;

Figs. 5, 6 and 7 are sectional views taken along the lines V—V, VI—VI and VII—VII of Fig. 4;

Fig. 8 is an enlarged side elevational view of the pull-off member;

Fig. 9 is an enlarged plan view of an end member embodying the features of the invention;

Fig. 10 is an enlarged side elevational view of the end member; and

Figs. 11 through 18 are sectional views taken along the lines XI—XI through XVIII—XVIII of Fig. 9, with the trolley conductor shown positioned therein.

Referring particularly to Figs. 1 and 2 of the drawings, the reference numerals 10 may denote, generally, portions of curved segments for use with trolley conductors 11 to provide smooth curves therein for the purpose of changing the direction of current collectors (not shown) as they travel along the trolley conductors. Since the segments are symmetrical about the line A—A, only one half of each segment is shown, the other half being similar.

In order to produce a change in the direction of the trolley conductors 11, suitable means, in the form of pull-off members 12 connected together by insulating members 13, may be provided for attachment to the trolley conductors to apply lateral pulls thereto so as to position the adjacent portions thereof in angular relation. Curved body or runner members 14 may be utilized for providing smooth curves between the angularly related portions of the trolley conductors 11. To make possible the use of a runner or body members 14 of relatively lightweight construction, means, such as the end members 15, may be provided for connecting the runner or body members 14 to the trolley conductors 11 so as to permit the trolley conductors 11 to be pulled off by the pull-off members 12 without interfering with passing current collectors. Approach members 16 may be secured to the end members 15 to properly position the conductors 11 relative thereto and provide a smooth approach. A suitable guard 17 may be utilized to substantially fill the generally fan-shaped opening between the runner member 14 and the trolley conductor 11 to prevent a dewired current collector from becoming wedged therein.

The body or runner member 14 may be of any suitable construction. Since it is a purpose of this invention to provide a curved segment that may be adjusted to different degrees of curvature, the runner member 14 is preferably of a relatively lightweight construction capable of withstanding relatively high bending stresses in the vertical direction and capable of being flexed in the lateral direction to different degrees of curvature. As shown in Figs. 2 and 3, the runner or body member may comprise a substantially T-shaped section of structural steel, aluminum, or any other suitable material, having a relatively flat back portion 20 with a depending web portion 21 having an enlarged rounded edge portion 22 for guiding a current collector. The runner or body member may be provided with a threaded stud 23 and a nut 24 for securing it to the pull-off member 12.

Referring to Figs. 4 through 8 of the drawings, it will be seen that the pull-off member 12 may comprise an elongated body member 25 having a substantially channel-shaped cross section with upstanding edge portions 26 which assist in resisting bending of the member. Suitable means may be provided adjacent the ends of the pull-off member for attaching support wires, insulating members and the like thereto, such as, for example, the openings 27.

For the purpose of securing the trolley conductor 11 to the body member to apply a lateral pull thereto, suitable means may be provided adjacent one end of the pull-off member, such as, for example, the depending portions 28 which provide a curved saddle or recess 29 for receiving the trolley conductor. An opening 30 may be provided adjacent the recess 29 for receiving a suitable retaining member such as the hook bolt 31 shown in Figs. 1 and 2.

The pull-off member 12 may be provided with an upwardly arched central portion 32 intermediate the ends so that the runner or body member 14 may be secured thereto with the enlarged edge portion 22 in substantially the normal horizontal plane of the trolley conductor 11. In order to provide for detachably securing the runner or body member 14 to the pull-off member 12 in different positions so as to adjust the curvature of the runner or body member, a plurality of openings 34, may be provided in the arched portion of the pull-off member. The openings 34 may be separate, but may, for example, be connected, with the centers thereof sufficiently spaced so that constrictions 35 are provided between the openings to prevent the bolt 23 from slipping from one opening to another in case the nut 24 should become loosened.

The guard 17 for covering the opening between the runner member and conductor may comprise a plurality of elongated metal strips having their ends positioned in the slots 37 in the upstanding edge portions 26 of the pull-off member in spaced relation, as shown in Figs. 2, 4 and 8, and their opposite ends secured to the end member 15 by means of a bolt 39. A simple and effective guard is thus provided for covering the fan-shaped opening between the runner member 14 and the trolley conductor 11, which is readily adjustable, since one or more of the strips 38 may easily be removed when the runner member is positioned relatively close to the trolley conductor 11 narrowing the opening therebetween.

Referring to Figs. 9 through 18, it will be seen that the end member 15 may comprise, in general, a substantially rigid elongated body member 40 having a runner portion 41 on the lower side which may, as shown, be curved or may, if desired, be substantially straight. The runner member 14 may be connected to the body member adjacent one end thereof by means of the substantially T-shaped groove 42, which may be provided in alignment with the adjacent end of the runner portion 41 for receiving the end portion of the runner member 14. Set screws 43 may be positioned in threaded openings 44 to secure the end of the runner member 14 in the groove 42 in alignment with the adjacent end of the runner portion 41.

Suitable means may be provided adjacent the other end of the body member 40 for receiving the trolley conductor 11, such as, for example, the longitudinal groove 45. Means may also be provided in connection with the groove 45 for elevating the trolley conductor 11 above its normal horizontal plane and diverting it to one side of the runner portion 41 such as, for example, the groove portion 46, which connects at one end with the groove 45 and opens to one side of the body member 40 intermediate the ends thereof, above any current collector passing along the runner portion 41.

In order to provide for depressing the trolley conductor 11 into substantially the normal horizontal plane of the conductor, within the length of the runner member 14, suitable means may be provided adjacent the end of the member 40 to which the runner member 14 is connected, to retain the conductor in the plane of the runner portion 41. For example, a laterally extending portion 48 may be provided to one side of the runner portion 41 and/or the runner member 14 having a groove 49 therein on the lower side.

The trolley conductor 11 may be positioned in the groove by inserting a suitable lever between the conductor and the body member in the recess 50 from above and prying the conductor outward and downward into the groove. It will then be positioned in substantially the normal horizontal plane of the trolley conductor, and in spaced relation to the runner portion and/or runner member to one side thereof, so as to be clear of passing circuit collectors. An opening 53 may be provided adjacent the laterally extending portion 48 to receive retaining means for securing the trolley conductor in the groove 49, such as, for example, the hook bolt 54 shown in Fig. 1. An opening 55 may be provided adjacent the same end for receiving the bolt 39 to secure the strips 38 of the guard 16 to the end member. Suitable means, such as flanged end portions 56 having openings 57 therein, may be provided adjacent the other end of the end member for securing the approach members 16 thereto to depress the trolley conductors 11 in the grooves 45 and provide a smooth approach for a current collector.

From the above description and the accompanying drawings, it will be apparent that we have provided in a simple and effective manner for relieving the curved runner member in a curved segment from the stresses normally applied thereto by diverting or deforming the trolley conductor. In accordance with our invention, the bending stresses incident to changing the direction and/or elevation of the trolley conductor to clear it from a passing current collector, are confined within the rigid end members which are readily capable of withstanding these stresses. The curved runner member being freed from these stresses may be made much lighter and more flexible, so as to permit more readily for adjusting the curvature to different conditions. The curvature of the runner member may be readily adjusted by securing it in different positions to the pull-off member through the use of the plurality of connected openings therein. The guard may also be easily adjusted in accordance with the position of the runner member, thus effecting a relatively simple and easily adjustable variable curved segment capable of adjustment over a relatively wide range of curvatures with a minimum of effort.

Since certain changes may be made in the above description, and different embodiments of the invention may be made without departing from the spirit thereof, it is intended that all the matter contained in the above description or shown in the accompanying drawings shall be considered as illustrative and not in a limiting sense.

We claim as our invention:

1. A curved segment for use with a trolley conductor comprising, a rigid pull-off member having means to secure the trolley conductor thereto and apply a lateral tension to maintain adjacent portions of the conductor in predetermined angular relation, an elongated curved runner member positioned between the angularly related portions and secured intermediate the ends thereof to the pull-off member with the lower edge substantially in the normal horizontal plane of the conductor, rigid end members secured to the ends of the curved runner member having runner portions in alignment therewith and means to elevate the conductor above its normal plane, divert it laterally from the lines of the runner portions and depress it into the normal plane of the conductor, and means adjacent the ends of the end members to aline the conductor with the runner portions thereof.

2. A rigid curved segment for use with a trolley conductor comprising, a pull-off member for attachment to the conductor to apply a lateral pull thereto and maintain adjacent portions in angular relation, a laterally flexible body member secured to the pull-off member intermediate its ends, a rigid end member connected at one end thereof to an end of the laterally flexible body member having a runner portion on the lower side and a groove on the upper side adjacent the other end to receive the trolley conductor and raise it above the normal plane of the conductor, means extending laterally from the end member to depress the conductor into the normal horizontal plane of the conductor in spaced relation to the runner portion, and an approach member connected to the other end of the end member to align the trolley conductor with the runner portion.

3. A curved segment for use with a trolley conductor comprising, a pull-off member for attachment to the trolley conductor to apply a lateral pull thereto and position the adjacent portions of the conductor in a predetermined angular relation, a laterally flexible elongated curved runner member, end members to connect the ends of the runner member to the adjacent portions of the conductor in tangential relation, means to detachably connect the runner member intermediate the ends to the pull-off member, and a plurality of elongated guard members connected to the end members at one end and detachably connected to the pull-off member in spaced relation at the other end to substantially cover the opening between the runner member and the trolley wire.

4. A curved segment for use with a trolley conductor comprising, an elongated pull-off plate having means at one end for securing the trolley conductor to apply a lateral pull thereto, an elevated portion adjacent the other end having upwardly projecting edge portions with spaced openings therealong, a laterally flexible curved runner member, end members to connect the ends of the runner member to the conductor, means including a plurality of openings in the pull-off plate for detachably connecting the runner members thereto intermediate the ends in different positions to vary the curvature thereof, and a guard member including a plurality of elongated metal strips having one end positioned in the openings in the edge portion of the pull-off plate and the other end connected to the end member.

5. A guard for a trolley device having a generally fan-shaped opening between portions thereof and a trolley conductor comprising, a plurality of elongated strips of metal fastened together adjacent the apex of the opening and secured to a portion of the device in spaced relation adjacent the other end of the opening.

6. An adjustable guard for a trolley device having a generally fan-shaped variable opening between a trolley conductor and a portion of the device comprising, a plurality of metal strips detachably connected together to a portion of the device adjacent the apex of the opening, and detachably positioned in spaced openings in another portion of the device opposite the apex.

7. An end member for use with a runner member in a curved segment for trolley conductor systems comprising, an elongated body member having a runner portion on the lower side, means at one end for connecting the end member to the runner member, means adjacent the other end to retain an adjacent portion of the conductor in alinement with the runner member, means on the end member to guide a trolley conductor above the normal plane of the conductor and to one side of the runner portion, and means intermediate the ends of the body member to position the conductor to substantially its normal plane in spaced relation to the runner portion.

8. An end member for attachment to an elongated member in a curved segment for trolley conductor systems comprising, a substantially rigid elongated body member having a longitudinal runner portion on the lower side, means adjacent one end to secure the elongated member in alignment with the runner portion, a groove adjacent the other end to guide a trolley conductor upwardly from its normal plane and to one side of the runner portion, means to retain an adjacent portion of the conductor in alinement with the runner portion and means projecting from the body member on the said side adjacent the said one end to depress the trolley conductor to substantially its normal plane at a predetermined distance to the said one side of the runner portion.

9. An end member for connecting a trolley conductor to a runner member comprising, an elongated rigid body member having a longitudinal runner portion on the lower side, means adjacent one end to secure the runner member in alignment with the runner portion, means adjacent the other end to retain the portion of the conductor adjacent the runner portion in alinement therewith and raise the trolley conductor above its normal plane intermediate the ends of the end member, and means adjacent said one end projecting outwardly to the said one side of the body member to depress the trolley conductor to substantially its normal plane in spaced relation to the runner portion.

10. An end member for connecting a relatively light curved runner member in tangential relation to a trolley conductor comprising, a rigid elongated body member having a longitudinal runner portion on the lower side, means adjacent one end to secure the runner member in alignment with the runner portion, means projecting to one side of the body member adjacent the said end to retain the trolley conductor in substantially the horizontal plane of the runner portion at a predetermined distance to the said one side thereof, and means including a groove on the upper side adjacent the other end to receive the trolley conductor, depress the portion adjacent the end into alinement with the runner portion and guide the trolley conductor upwardly and to the said one side of the runner portion.

11. An end member for connecting a laterally curved body member to a trolley conductor in tangential relation comprising, a rigid elongated body member having a runner portion on the lower side and a groove in the upper side at one end to direct the conductor to one side of and above the runner portion, means to depress the conductor into alinement with the runner portion at said one end and means for connecting the end member to the body member with the runner portion in alinement therewith.

12. An end member for connecting a laterally curved tangent runner member to a trolley conductor comprising, an elongated body member having a curved runner portion on the lower side and an opening adjacent one end to position the end of the runner member in alinement with the runner portion, a groove adjacent the other end on the upper side to receive the trolley conductor and retain it on the outer side of the runner portion above said runner portion, and means to depress the conductor adjacent the groove end into alinement with the runner member.

13. The combination with an elongated laterally curved runner member positioned between and tangent to adjacent angularly related portions of a trolley conductor which is laterally tensioned by a pull-off member operatively connected to the trolley conductor and the runner member intermediate the ends thereof on the outer side of the runner member, of a substantially rigid end member having a runner portion on the lower side, means including an opening adjacent one end of the end member to secure an end of the curved runner member in alinement with the end of said runner portion adjacent said end of the end member, means including a groove on the upper side of the end member extending from the other end thereof to receive the trolley conductor and direct it to the outer side of the end member adjacent the said end, and means to secure the trolley conductor in the groove in alinement with the said other end of the runner portion.

RAYMOND P. HANNA.
ANGUS G. SCOTT.